United States Patent [19]

Iizuka et al.

[11] Patent Number: 5,485,561
[45] Date of Patent: Jan. 16, 1996

[54] METHOD OF AND APPARATUS FOR REPLACING REGION OF INTEREST

[75] Inventors: Miyuki Iizuka; Akira Shiba; Isamu Yamada, all of Kawasaki, Japan

[73] Assignee: Fujitsu Limited, Kawasaki, Japan

[21] Appl. No.: 281,606

[22] Filed: Jul. 28, 1994

[30] Foreign Application Priority Data

Aug. 13, 1993 [JP] Japan .................................... 5-201377

[51] Int. Cl.⁶ .................................................. G06T 15/00
[52] U.S. Cl. ........................ 395/133; 395/134; 395/155; 395/157
[58] Field of Search ..................... 395/133–139, 395/141, 155–161; 364/413.13–413.19, 413.22, 413.25

[56] References Cited

U.S. PATENT DOCUMENTS

5,182,728  1/1993  Shen et al. .................................. 367/7
5,265,197  11/1993 Kondo ..................................... 395/120
5,319,551  7/1994  Sekiguchi et al. ................. 364/413.19
5,343,390  8/1994  Doi et al. ........................... 364/413.16
5,359,513  10/1994 Kand et al. ........................ 364/413.23

Primary Examiner—Almis R. Jankus
Attorney, Agent, or Firm—Staas & Halsey

[57] ABSTRACT

An ROI (region of interest) is drawn according to common and shape variables. The common variables are common to ROIs irrespectively of the shape thereof. Expressions defining relations between the common and shape variables are determined and stored for each ROI in advance. When an instruction is issued to replace a first ROI with a second ROI having a different shape, shape variables for the second ROI are calculated from the common variables of the first ROI according to the expressions, and the second ROI defined by the calculated shape variables is displayed.

14 Claims, 8 Drawing Sheets

METHOD OF AND APPARATUS FOR REPLACING REGION OF INTEREST

BACKGROUND OF THE INVENTION

1. Field of the Invention

The present invention relates to a method of and an apparatus for replacing an ROI (region of interest) with another ROI having a different shape. The ROI is a region which is specified in image data and in which various processes such as calculation of an average or dispersion are carried out.

In an ultrasonic diagnostic system, a rectangular ROI, for example, is prepared around a tumor. It is sometimes required to replace the rectangular ROI with an elliptic or sectorial trapezoidal ROI according to the shape of the tumor. The sectorial trapezoid is a shape defined with two concentric circles and two radii.

The present invention is concerned with a method and apparatus that can speedily replace an ROI with another ROI having a different shape.

2. Description of the Related Art

When displaying an ROI on a display screen, a user manipulates a mouse to bring a mouse cursor onto one of icons representing different shapes such as a circle, rectangle, and sectorial trapezoid. The user specifies with the mouse a position where the ROI is to be drawn. Then, the ROI is drawn in the specified shape at the specified position. To change the size of the ROI, the user specifies the ROI and specifics positions in vertical and oblique directions.

To change the shape of the ROI, the ROI must be erased and redrawn. The user must specify the ROI, enter an instruction to erase the ROI, specify one of the icons representing a required shape, and indicate a position where a new ROI having the required shape is drawn. Then, the ROI is drawn on the display screen. The size of the ROI is changed only after the user specifies the ROI and specifies a required size.

SUMMARY OF THE INVENTION

An object of the present invention is to provide a method of and an apparatus for simply and quickly replacing an ROI with another ROI of different shape.

In order to accomplish the object, the present invention provides a method of replacing a first ROI with a second ROI. The method involves the step of calculating shape variables of the second ROI from common variables of the first ROI according to relationships between the common variables and the shape variables, the relationships being predetermined with respect to shapes of individual ROI's, and the step of replacing the first ROI with the second ROI determined by the calculated shape variables.

The present invention also provides an apparatus for replacing a first ROI with a second ROI. The apparatus employs a unit for calculating shape variables of the second ROI from common variables of the first ROI according to the relationships between the common variables and the shape variables, the relationships being predetermined with respect to shapes of individual ROI's, and a unit for replacing the first ROI with the second ROI determined by the calculated shape variables.

DESCRIPTION OF THE PREFERRED EMBODIMENTS

Figure 1:
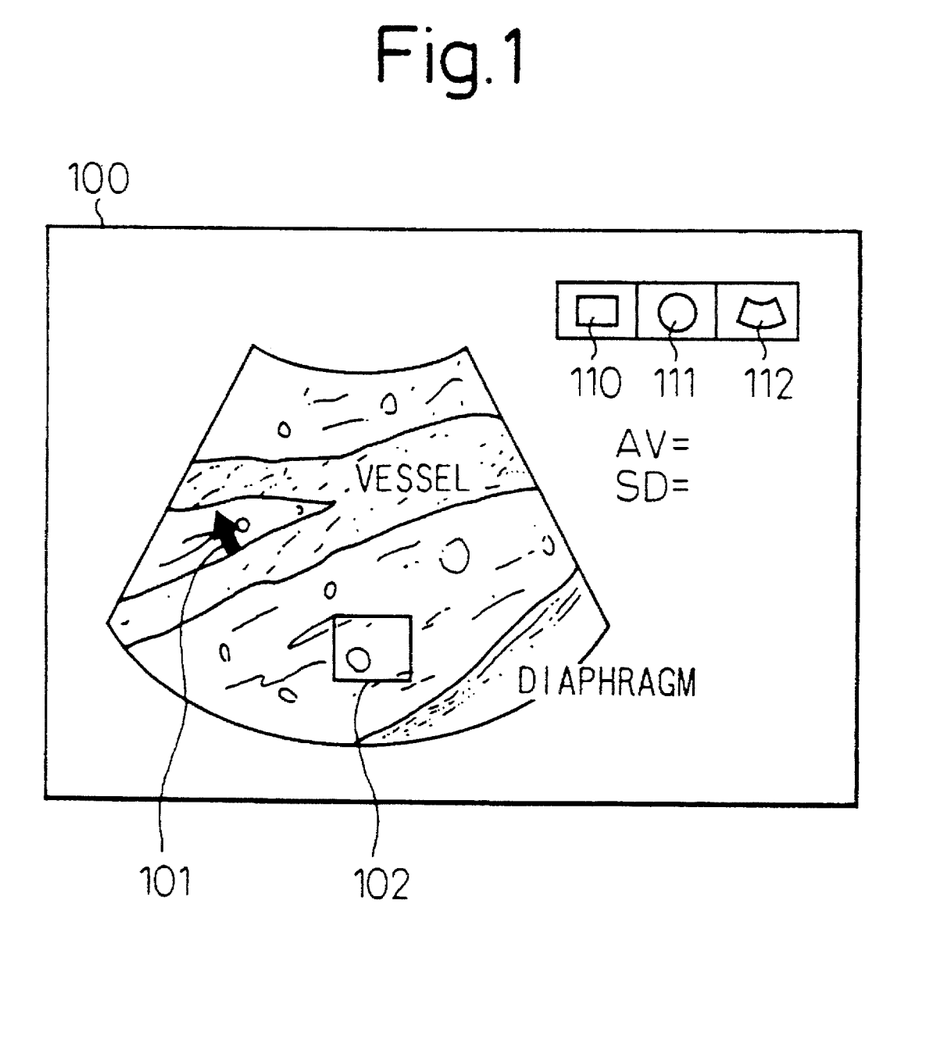
FIG. 1 is a diagram showing an example of a display screen of an ultrasonic diagnostic system.

FIG. 1 shows an example of a display screen 100 of an ultrasonic diagnostic system. A mouse cursor 101 moves over the screen 100 according to operations of a mouse. The mouse cursor 101 is positioned on one of icons 110 to 112 and the mouse is clicked, to select the shape of an ROI (region of interest) 102 to be drawn or to replace a current ROI. The position and size of the ROI 102 are determined according to instructions provided through the mouse. The screen 100 displays an average AV and a standard deviation SD of pixels in the ROI 102.

In a first embodiment of the present invention, the center position $C(x, y)$, vertical length v, and horizontal length h on an x-y plane of the ROI are employed as common variables, which are used in replacement of the ROI.

Figure 2:
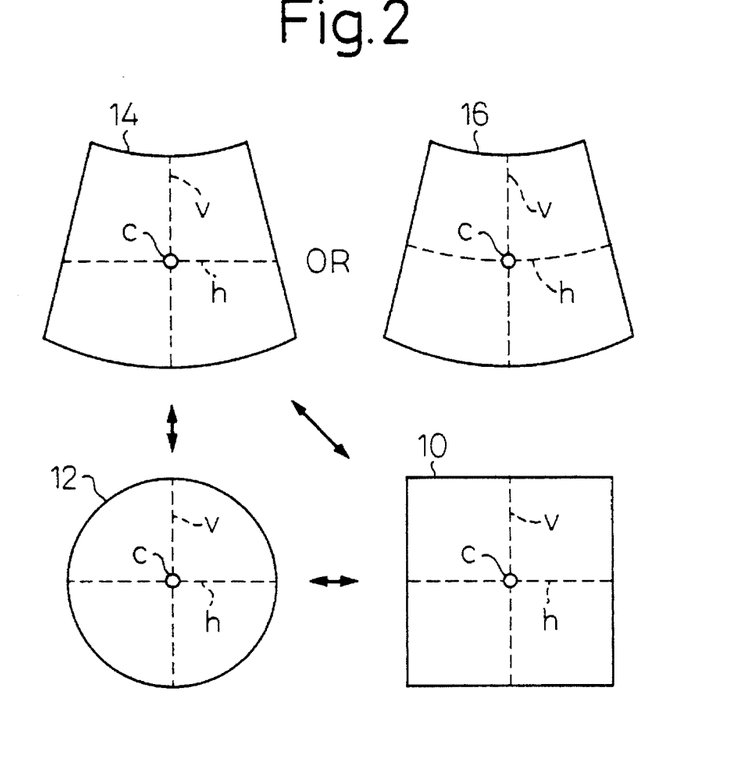
FIGS. 2 and 3 are diagrams explaining a first embodiment of the present invention.

FIG. 2 shows a rectangular (square) ROI 10. The center C and vertical and horizontal lengths of the ROI 10 provide common variables C, v, and h, respectively.

When replacing the rectangular ROI 10 with an elliptic or a circular ROI 12, a user is allowed to simply issue an instruction of replacement, without specifying shape variables of an ellipse such as lengths of major and minor axes of the ellipse. In response to the instruction, the rectangular ROI 10 is erased, an ellipse 12 having the vertical and horizontal axes which are as long as the common variables v and h, respectively, is determined, and the ellipse 12 is drawn around the center C.

When replacing the rectangular ROI 10 with a sectorial trapezoidal ROI, a sectorial trapezoid 14 in which a difference in radius between two concentric circles that define the sectorial trapezoid 14 is equal to the common variable v and a distance between intermediate points on two radial straight sides intersecting the concentric circles is equal to the common variable h, is determined, and the sectorial trapezoid 14 is drawn. Alternatively, the rectangular ROI 10 may be replaced with a sectorial trapezoidal ROI 16 in which the length of an arc whose radius is an average of the radii of two concentric circles that define the ROI 16 is equal to the common variable h.

Figure 3:
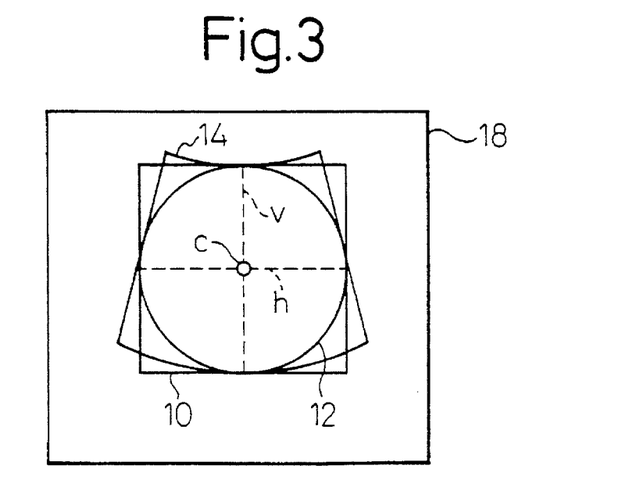

FIG. 3 shows a display screen 18 showing the three ROIs drawn with the common variables C, h, and v.

Figure 4:
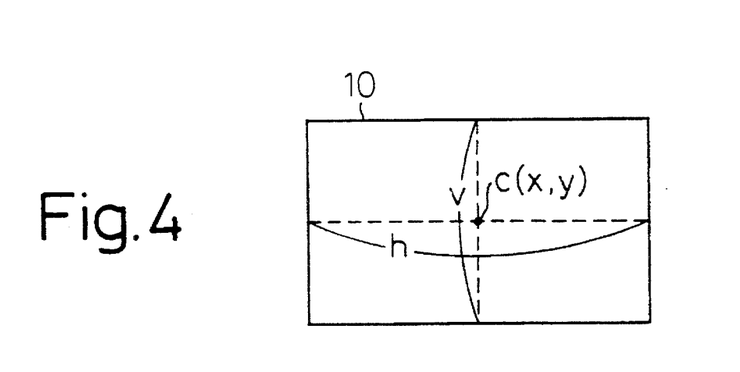
FIGS. 4 to 6 are diagrams explaining relationships between common variables and shape variables in the first embodiment.

In the first embodiment of the present invention, the horizontal length of a rectangular ROI 10 is equal to a common variable h and the vertical length thereof to a common variable v, as shown in FIG. 4.

Figure 5:
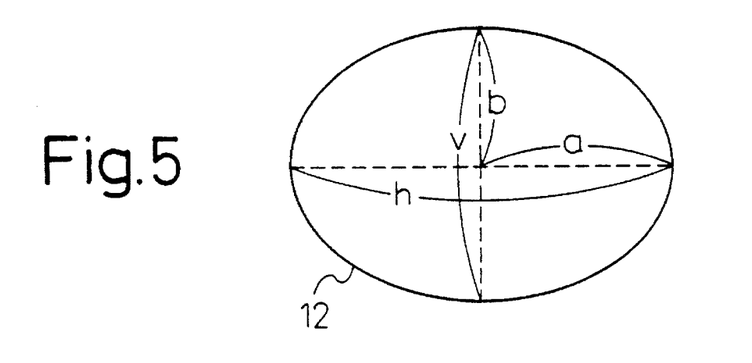

When an ellipse is expressed as follows:

$$x^2/a^2 + y^2/b^2 = 1 \quad (1)$$

as shown in FIG. 5, the shape variables a and b of an elliptic ROI 12 are expressible with the common variables h and v as follows:

$$2a = h \quad (2)$$

$$2b = v \quad (3)$$

Figure 6:
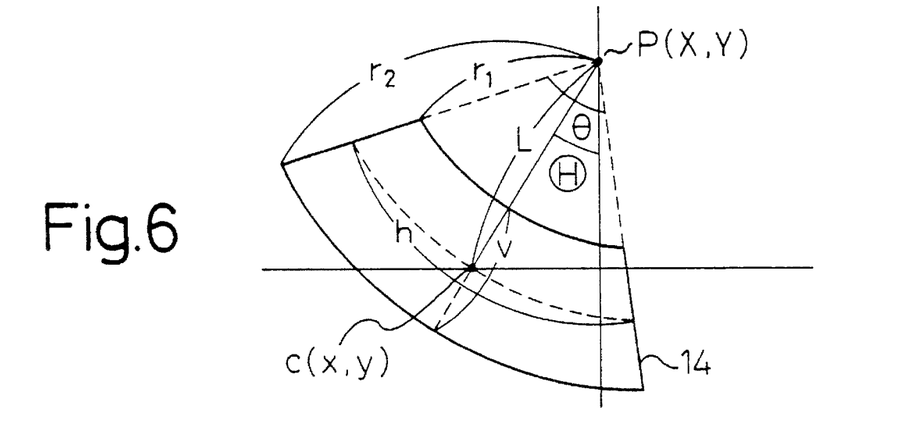

As the shape variables of a sectorial trapezoidal ROI 14, the radius of the smaller concentric circle, the radius of the larger concentric circle, and a center angle are denoted as r1, r2 and θ, respectively. In an ultrasonic diagnostic system, the center of the two concentric circles is fixed at a position P(X, Y) corresponding to the center of scan lines of a sector or convex probe. An azimuth angle of a segment PC, that is, an angle between the segment PC and an axis y is denoted as θ. The shape variables r1, r2, θ, and θ of the ROI 14 are expressible with the common variables h and v as follows:

$$r1 = L - v/2 \quad (4)$$

$$r2 = L + v/2 \quad (5)$$

$$\theta = h/L, \text{ or } \theta = 2\tan^{-1}(h/2L) \quad (6)$$
$$\theta = \tan^{-1}\{(Y-y)/(X-x)\} \quad (7)$$

$$L = \sqrt{(X-x)^2 + (Y-y)^2} \quad (8)$$

In the second embodiment of the present invention, a position C(x, y), an aspect ratio p, and an area s are employed as common variables to perform replacement of an ROI.

Figure 7:
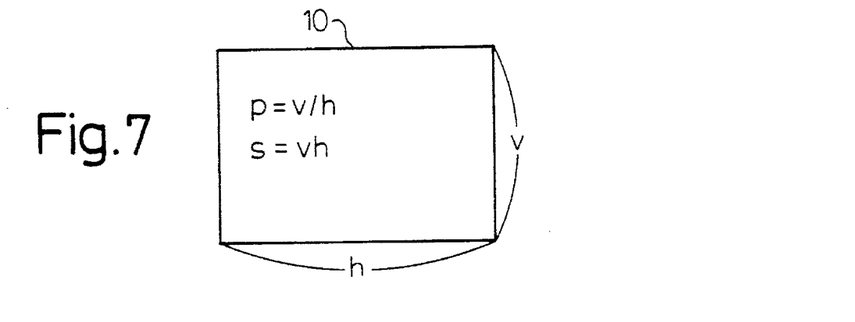
FIGS. 7 to 9 are diagrams explaining a second embodiment of the present invention.

As shown in FIG. 7, relationships between the shape variables h and v and the common variables p and s in the rectangular ROI 10 are expressed as follows:

$$p = v/h \quad (9)$$

$$s = vh \quad (10)$$

Figure 8:
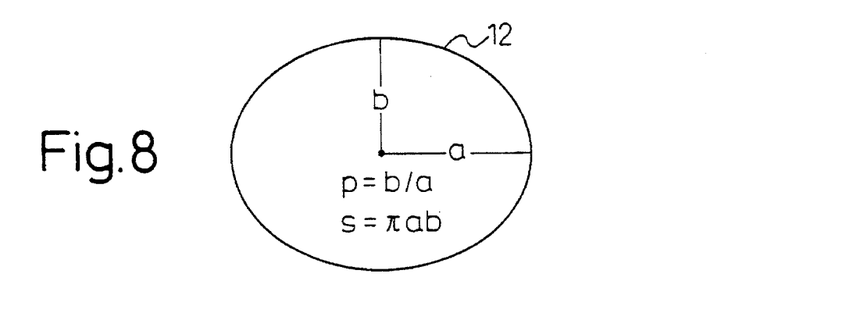

As shown in FIG. 8, with respect to the elliptic ROI 12, the relationships are expressed as follows:

$$p = b/a \quad (11)$$

$$s = \pi a b \quad (12)$$

Accordingly, the relationships of the shape variables a and b to the shape variables h and v of the rectangle are expressed as follows:

$$a = h/\sqrt{\pi} \quad (13)$$

$$b = v/\sqrt{\pi} \quad (14)$$

Figure 9:
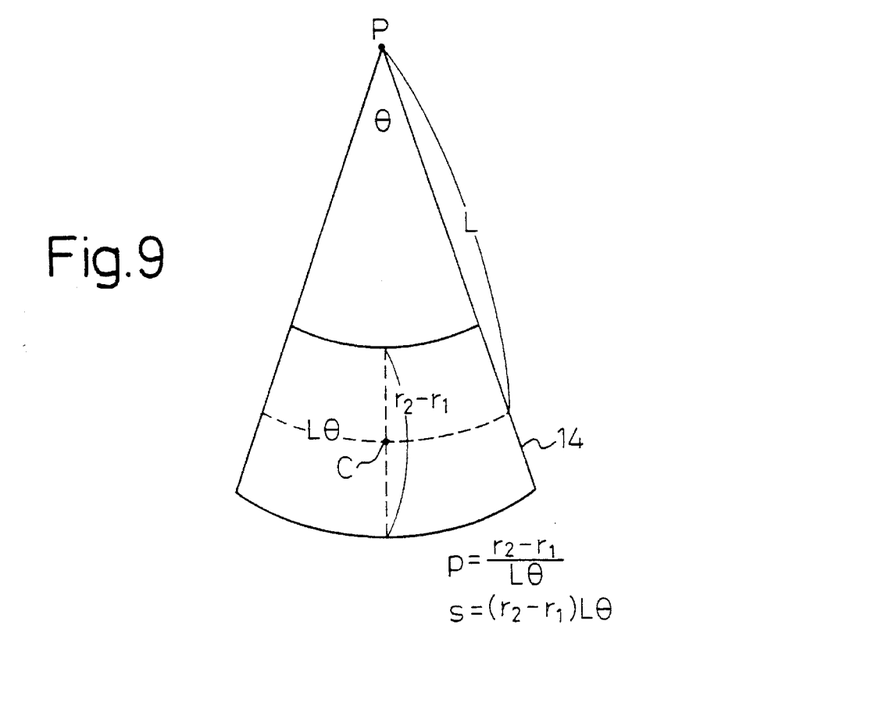

As shown in FIG. 9, with respect to the sectorial trapezoidal ROI 14, the relationships are expressed as follows:

$$p = (r2 - r1)/L\theta \quad (15)$$

$$s = (r2 - r1)L\theta \quad (16)$$

Accordingly, relationships with the shape variables h and v of the rectangle are expressed as follows:

$$L\theta = h \quad (17)$$

$$r2 - r1 = v \quad (18)$$

Accordingly, instead of using expressions (9) and (10), (11) and (12), and (15) and (16) in which the aspect ratio p and the area s are employed as the common variables, the same results can be obtained when the mutual conversion between the common variables and the shape variables is carried out using expressions (13) (14) and (17) (18) in which the vertical length v and the horizontal length h of the rectangle are treated as if they are the common variables.

Figure 10:
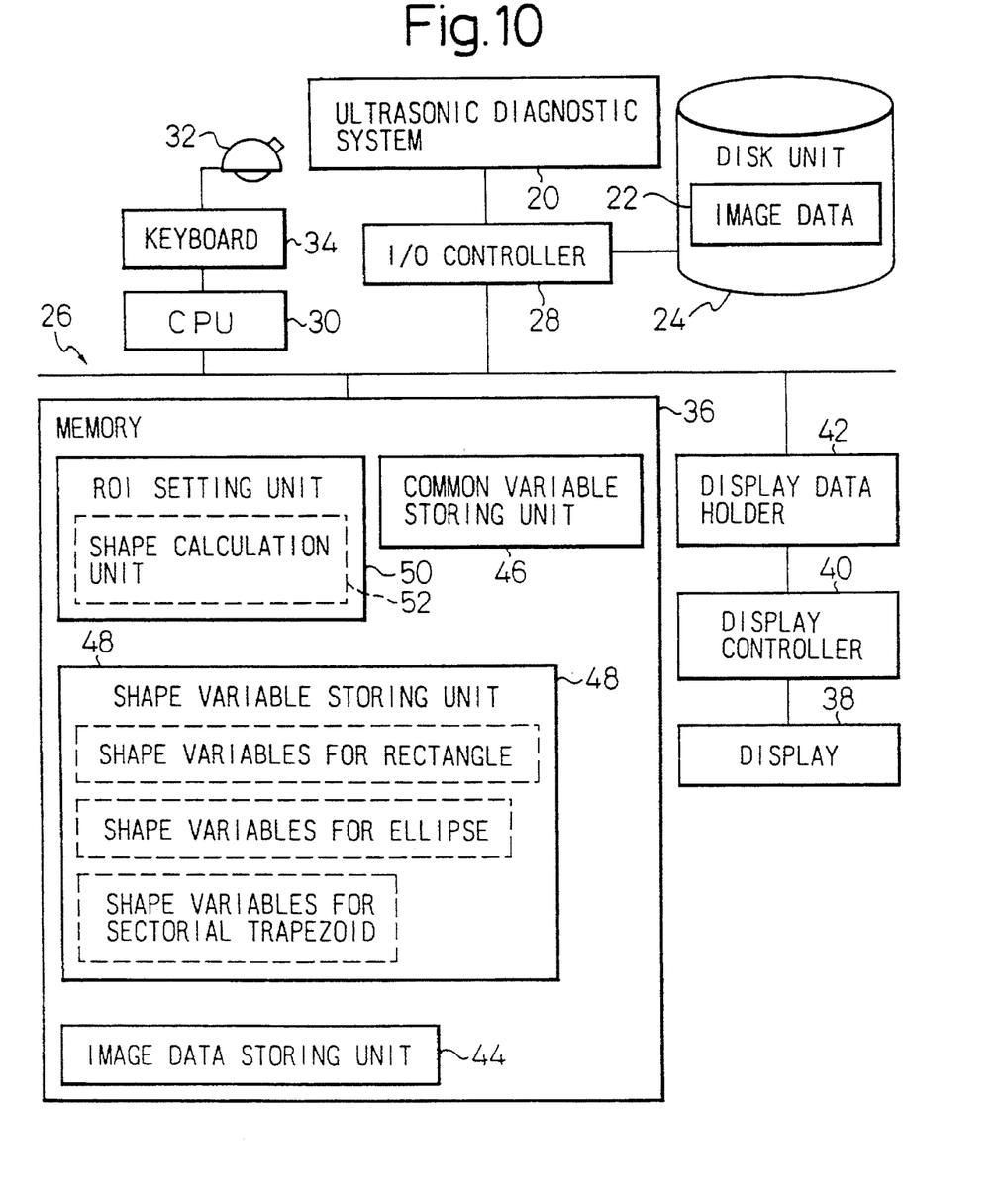
FIG. 10 is a block diagram showing an apparatus according to the present invention.

FIG. 10 is a block diagram showing an apparatus for achieving the method of the present invention.

The apparatus includes an ultrasonic diagnostic system 20, a disk unit 24 for storing image data 22 provided by the diagnostic system 20, a data processor 26 for displaying the image data 22 and setting and changing ROIs, and an I/O controller 28 for connecting the units 20, 24, and 26 to one another and transferring the image data 22 among them.

The data processor 26 has a CPU 30, a keyboard 34 with a mouse 32, a memory 36, a display 38, a display controller 40, and an image data holder 42 for holding image data to be displayed on the display 38. The memory 36 includes an area for an image data storing unit 44, an area for a common variable storing unit 46, an area for a shape variable storing unit 48, and an area for storing a software area to realize an ROI setting unit 50. The image data storing unit 44 stores image data to be processed. The common variable storing unit 46 stores the common variables. The shape variable storing unit 48 stores the shape variables. The ROI setting unit 50 includes a shape calculation unit 52 for mutually converting shape and common variables.

Figure 11:
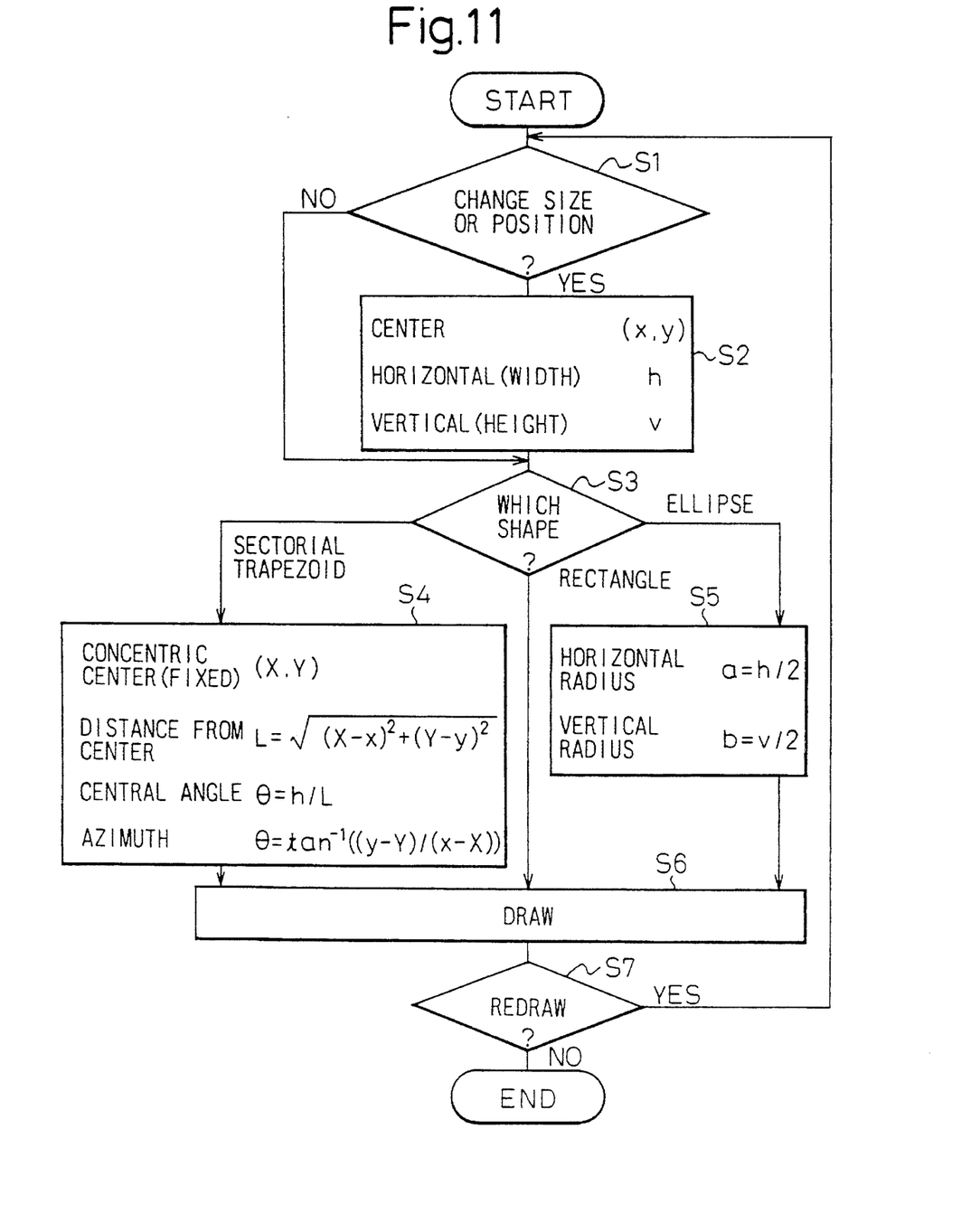
FIG. 11 is a flowchart showing procedures in operating the apparatus of the present invention.

FIG. 11 is a flowchart showing steps taken by a user who operates the apparatus of FIG. 10.

In step S1, it is determined whether or not the size and/or position of an ROI presently displayed on the display 38 must be changed. If YES, step S2 is carried out. In step S2, a user employs the mouse 32 to drag the ROI to a required position, or specify a required size of the ROI. Thereafter, the coordinates of the center of the ROI are stored as a common variable (x, y) in the common variable storing unit 46. According to shape variables that define the ROI and the expressions (2) to (8), or (13), (14), (17), and (18), common variables h and v are calculated and stored in the common variable storing unit 46. When the ROI is rectangular, the common variables h and v are equal to the horizontal and vertical lengths thereof.

In step S3, the user employs the mouse 32 to specify one of the icons 110 to 112 (FIG. 1), to select the shape of the ROI. If a rectangle is selected, in step S6, a rectangular ROI with the common variables h and v as horizontal and vertical lengths thereof is drawn. If a sectorial trapezoid is selected, in step S4, shape variables r1, r2, θ, and θ are calculated from the common variables h, v, x, and y according to the expressions (4) to (8), and in the step S6, a sectorial trapezoidal ROI is drawn. If an ellipse is selected, in step S5, shape variables a and b are calculated from the common variables h and v according to the expressions (2) and (3) or (13) and (14), and in the step S6, an elliptic ROI is drawn.

Figure 12:
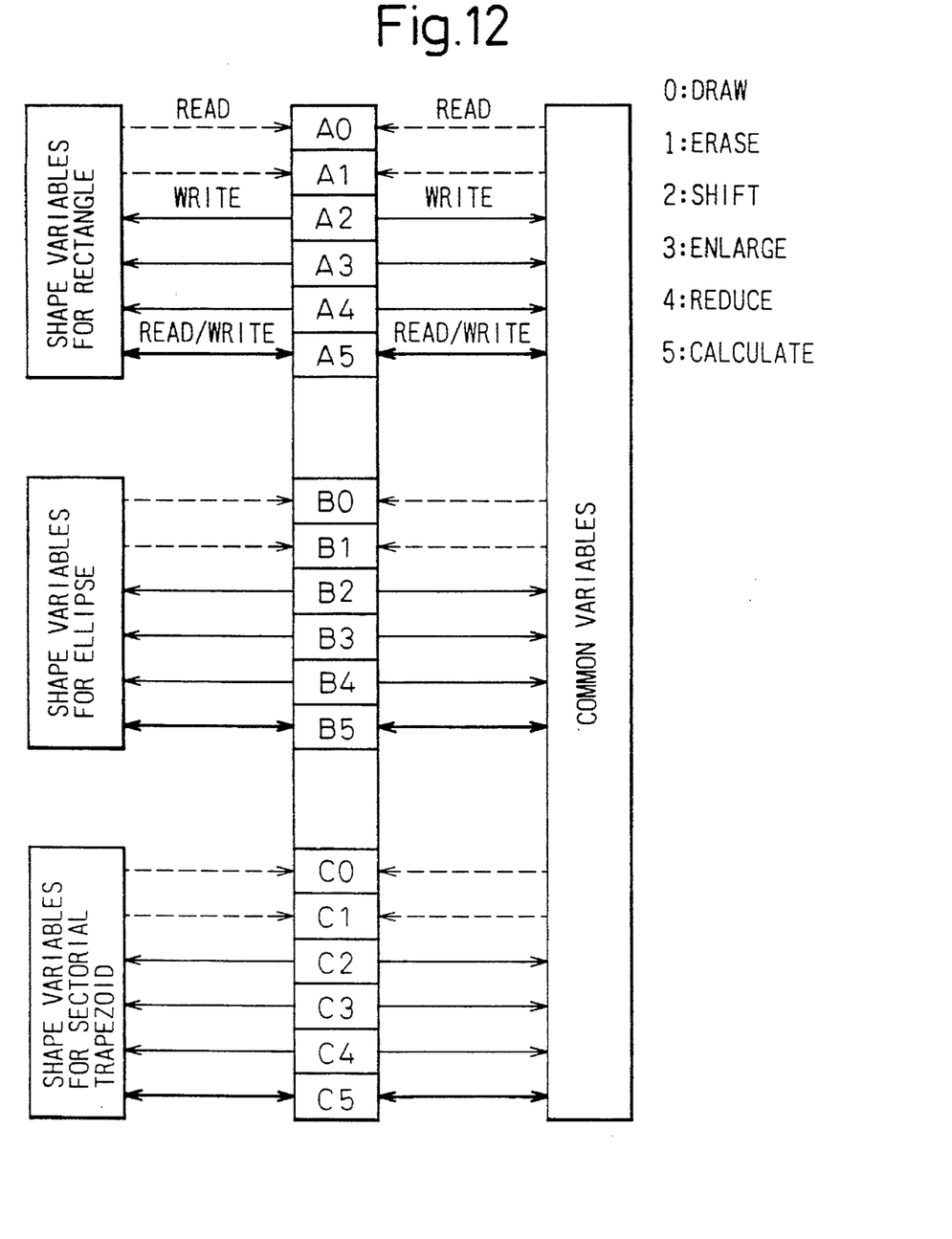
FIG. 12 is a diagram showing a shape calculation unit 52 and the operation thereof which is included in an ROI setting Unit 50 of the apparatus of FIG. 10.

FIG. 12 shows a construction and an operation of the shape calculation unit 52 in the ROI setting unit 50. A program for processing ROIs consists of three class objects A, B and C which belong to a class, and the class objects A, B and C are in charge of processing of rectangular, elliptic, and sectorial trapezoidal ROIs, respectively. The class contains six member functions, i.e., 0=draw, 1=erase, 2=shift, 3=enlarge, 4=reduce, and 5=calculate.

The member function "draw" draws an ROI according to shape variables and common variables indicating center coordinates. The member function "erase" draws an ROI with a background color according to shape variables and center coordinates, to erase a presently displayed ROI. The member function "shift" determines and stores the center coordinates of an ROI specified with the mouse. The member functions "enlarge" and "reduce" determine shape variables according to the size of an ROI specified with the mouse and stores the shape variables. The member function "calculate" calculates common variables from shape variables, or shape variables from common variables.

In order to execute the program having the above construction, first, a statement of, for example, "Pointer=B" is executed to substitute a pointer to a class object corresponding to a required shape for a pointer variable "Pointer", and then a statement of, for example, "Pointer→draw" is executed to carry out a required member function. As a result, an elliptic ROI is drawn in this example.

Figure 13:
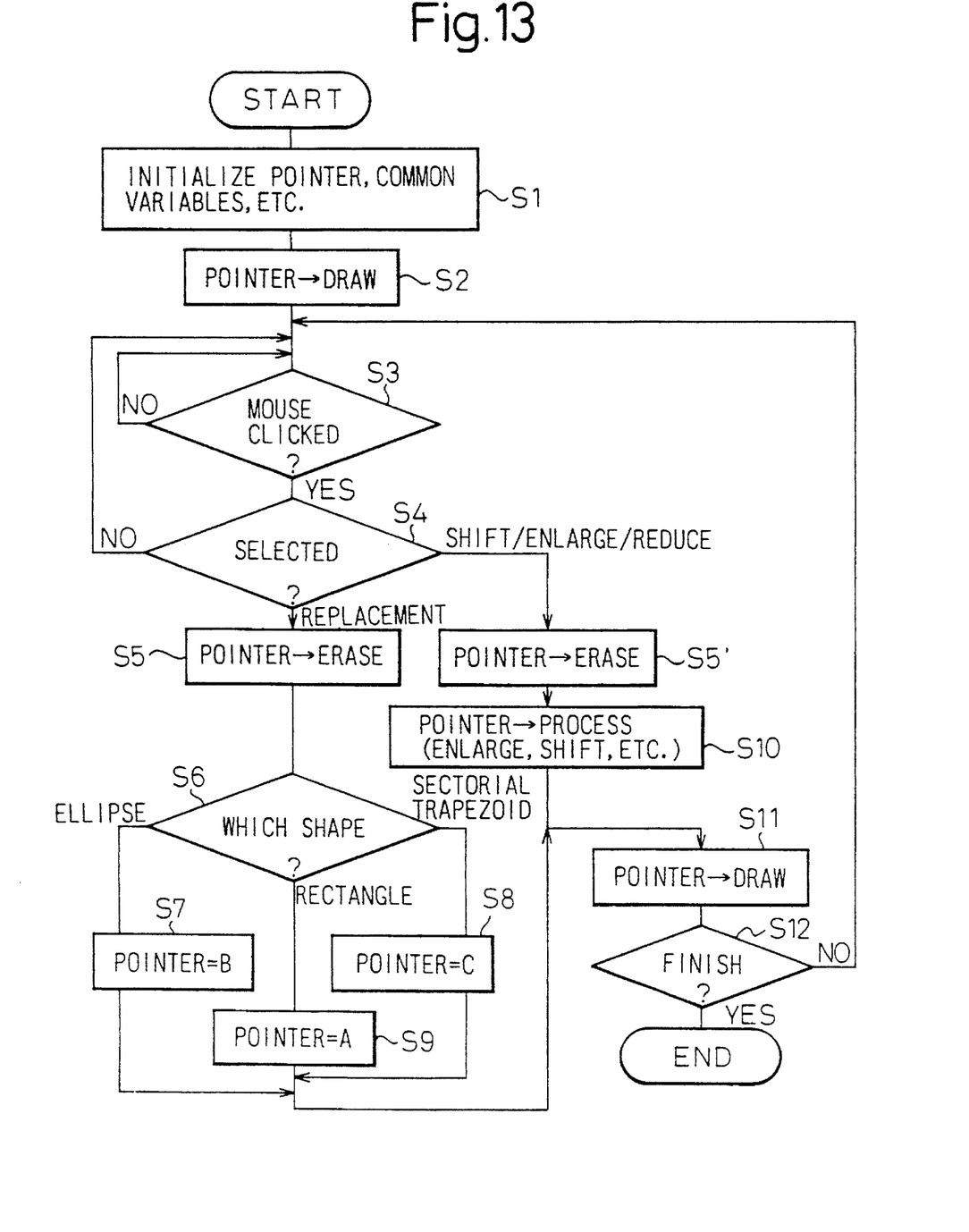
FIG. 13 is a flowchart showing processes carried out by the ROI setting unit 50.

FIG. 13 is a flowchart showing steps carried out by the ROI setting unit 50 that executes the program mentioned above to process ROIs.

In step S1, the pointer variable "Pointer" is initialized by substituting a pointer to any one of the objects A to C for the pointer variable, and common variables are initialized by substituting predetermined initial values for them. Step S3 waits for the mouse to be clicked. If the mouse is clicked, in step S4, it is determined which process has been selected.

If one of the shift, enlarge, and reduce functions has been selected, in step S5', a statement of "Pointer→erase" is executed to erase the presently displayed ROI. In step S10 a statement of "Pointer→specified process" is executed to update the common and shape variables. In step S11, a statement of "Pointer→ draw" is executed to draw an ROI according to the updated variables.

If it is determined in step S4, that the present ROI must be replaced with an ROI of different shape, in step S5, a statement of "Pointer→erase" is executed to erase the present ROI. In step S6, the user selects one of the shapes. In steps S7 to S9 a pointer to one of the objects A to C corresponding to the user specified shape is substituted for the pointer variable "Pointer." Then, the flow joins step S11, which draws an ROI in the specified shape.

We claim:

1. A method of replacing a first region of interest with a second region of interest using common variables by which characteristics common to individual regions of interest are evaluated, the method comprising the steps of:

calculating shape variables of the second region of interest from the common variables according to relationships between the common variables and the shape variables, the relationships being predetermined with respect to shapes of individual regions of interest; and replacing the first region of interest with the second region of interest determined by the calculated shape variables.

2. The method according to claim 1, wherein the relationships are predetermined such that the vertical and horizontal lengths of each region of interest determined by shape variables calculated from the common variables are unchanged irrespective of the shape of the region of interest.

3. The method according to claim 1, wherein the relationships are predetermined such that the aspect ratio and area of each region of interest determined by shape variables calculated from the common variables are unchanged irrespective of the shape of the region of interest.

4. An apparatus for replacing a first region of interest with a second region of interest using common variables by which characteristics common to individual regions of interest are evaluated, the apparatus comprising:

means for calculating shape variables of the second region of interest from the common variables according to relationships between the common variables and the shape variables, the relationships being predetermined with respect to shapes of individual regions of interest; and means for replacing the first region of interest with the second region of interest determined by the calculated shape variables.

5. The apparatus according to claim 4, wherein the relationships are predetermined such that the vertical and horizontal lengths of each region of interest determined by shape variables calculated from the common variables are unchanged irrespective of the shape of the region of interest.

6. The apparatus according to claim 4, wherein the relationships are predetermined such that the aspect ratio and area of each region of interest determined by shape variables calculated from the common variables are unchanged irrespective of the shape of the region of interest.

7. A method of replacing a first region of interest with a second region of interest having a different shape than the first region of interest, common variables between the first region of interest and the second region of interest correspond to the shape of the first region of interest and to the shape of the second region of interest, the shape of the second region of interest being defined by values of shape variables related to the common variables by predetermined relationships for replacing a respective shape with a different shape, the method comprising:

determining values of the common variables;

calculating values of the shape variables from the values of the common variables; and replacing the first region of interest with the second region of interest, the second region of interest having a shape defined by the calculated values of the shape variables.

8. The method according to claim 7, wherein the shape of the first region of interest and the shape of the second region of interest each have a first length and a second length which is perpendicular to the first length, the common variables include the first length and the second length, and the step of calculating values of the shape variables further comprises:

calculating the values of the shape variables to define a second region of interest where the first length of the second region of interest is the same as the first length of the first region of interest and the second length of the second region of interest is the same as the second length of the first region of interest.

9. The method according to claim 7, wherein the shape of the first region of interest and the shape of the second region of interest each have an aspect ratio and an area, and the step of calculating values of the shape variables further comprises:

calculating values of the shape variables of the second region of interest to define the second region of interest to have the same aspect ratio and the same area as the first region of interest.

10. An apparatus of replacing a first region of interest with a second region of interest having a different shape than the first region of interest, common variables between the first region of interest and the second region of interest correspond to the shape of the first region of interest and to the shape of the second region of interest, the shape of the second region of interest being defined by values of shape variables related to the common variables by predetermined relationships for replacing a respective shape with a different shape, the apparatus comprising:

means for determining values of the common variables;

means for calculating values of the shape variables from the common variables; and means for replacing the first region of interest with the second region of interest, the second region of interest having a shape defined by the calculated values of the shape variables.

11. The apparatus according to claim 10, wherein the shape of the first region of interest and the shape of the second region of interest each have a first length and a second length which is perpendicular to the first length, the common variables include the first length and the second length, and the means for calculating values of the shape variables comprises:

means for calculating the values of the shape variables to define the second region of interest where the first length of the second region of interest is the same as the first length of the first region of interest and the second length of the second region of interest is the same as the second length of the first region of interest.

12. The apparatus according to claim 10, wherein the shape of the first region of interest and the shape of the second region of interest each have an aspect ratio and an area, and the means for calculating values of the shape variables comprises:

means for calculating the values of the shape variables to define the second region of interest to have the same aspect ratio and the same area as the first region of interest.

13. A method of replacing, on a display screen, a first region of interest with a second region of interest having a different shape than the first region of interest, common variables between the first region of interest and the second region of interest correspond to the shape of the first region of interest and to the shape of the second region of interest, the shape of the second region of interest being defined by values of shape variables related to the common variables by predetermined relationships for replacing a respective shape with a different shape, the method comprising:

displaying the first region of interest on the display screen;

selecting the second region of interest;

determining values of the common variables;

calculating values of shape variables from the values of the common variables; and displaying the second region of interest on the display screen in place of the first region of interest, the second region of interest having a shape defined by the calculated values of the shape variables.

14. An apparatus for replacing a first region of interest with a second region of interest having a different shape than the first region of interest, common variables between the first region of interest and the second region of interest correspond to the shape of the first region of interest and to the shape of the second region of interest, the shape of the second region of interest being defined by values of shape variables related to the common variables by predetermined relationships for replacing a respective shape with a different shape, the apparatus comprising:

a display screen;

means for displaying the first region of interest on the display screen;

means for selecting the second region of interest;

means for determining values of the common variables;

means for calculating values of shape variables from the values of the common variables; and means for displaying the second region of interest on the display screen in place of the first region of interest, the second region of interest having a shape defined by the calculated values of the shape variables.

* * * * *

UNITED STATES PATENT AND TRADEMARK OFFICE
CERTIFICATE OF CORRECTION

PATENT NO. : 5,485,561
DATED : January 16, 1996
INVENTOR(S) : Miyuki IIZUKA et al.

It is certified that error appears in the above-indentified patent and that said Letters Patent is hereby corrected as shown below:

Column 2, line 15, delete "Unit" and insert therefor --unit--.

Column 3, line 58, after "FIG", delete the comma (",") and insert therefor a period (".").

Signed and Sealed this

Twenty-third Day of April, 1996

Attest:

BRUCE LEHMAN

*Attesting Officer*   *Commissioner of Patents and Trademarks*